UNITED STATES PATENT OFFICE.

AUSTIN M. TURNEY, OF BUTTERNUTS, NEW YORK.

IMPROVED COMPOSITION FOR DESTROYING INSECTS.

Specification forming part of Letters Patent No. 52,345, dated January 30, 1866.

*To all whom it may concern:*

Be it known that I, AUSTIN M. TURNEY, of the town of Butternuts, in the county of Otsego and State of New York, have discovered, through the compounding of certain ingredients, a new and valuable article, remedy, or compound for the destruction of lice on hops or hop-vines, grubs or worms in cornhills, worms upon currant bushes or fruit trees, and all destructive or poisonous insects upon all vegetation.

To enable others to make use of my discovery, I will proceed to name the ingredients, their proper proportions, manner of preparing, and mode of using on vegetation.

To one barrel of soft water I put the following named ingredients and in the following proportions: five pounds tobacco, two and one-half pounds quassia-wood, one-fourth pound of copperas, one pound sulphur, one-fourth pound gum-aloes, and one pint of gastar. The whole so mixed, I heat till the water boils. As soon as cold it is ready for use. It may then be applied to hop-vines and on other vegetation where needed, by means of watering-pots, brush, broom, or syringe.

Now, what I claim as my discovery, and desire to secure by Letters Patent, is—

The above-described article, remedy, or compound, from the above-named ingredients, as and for the purposes herein set forth.

AUSTIN M. TURNEY.

Witnesses:
ELI DONALDSON,
J. H. NILES.